J. LYMAN.
Drafting Protractors.
No. 280. A. I. Patented May 15, 1860.
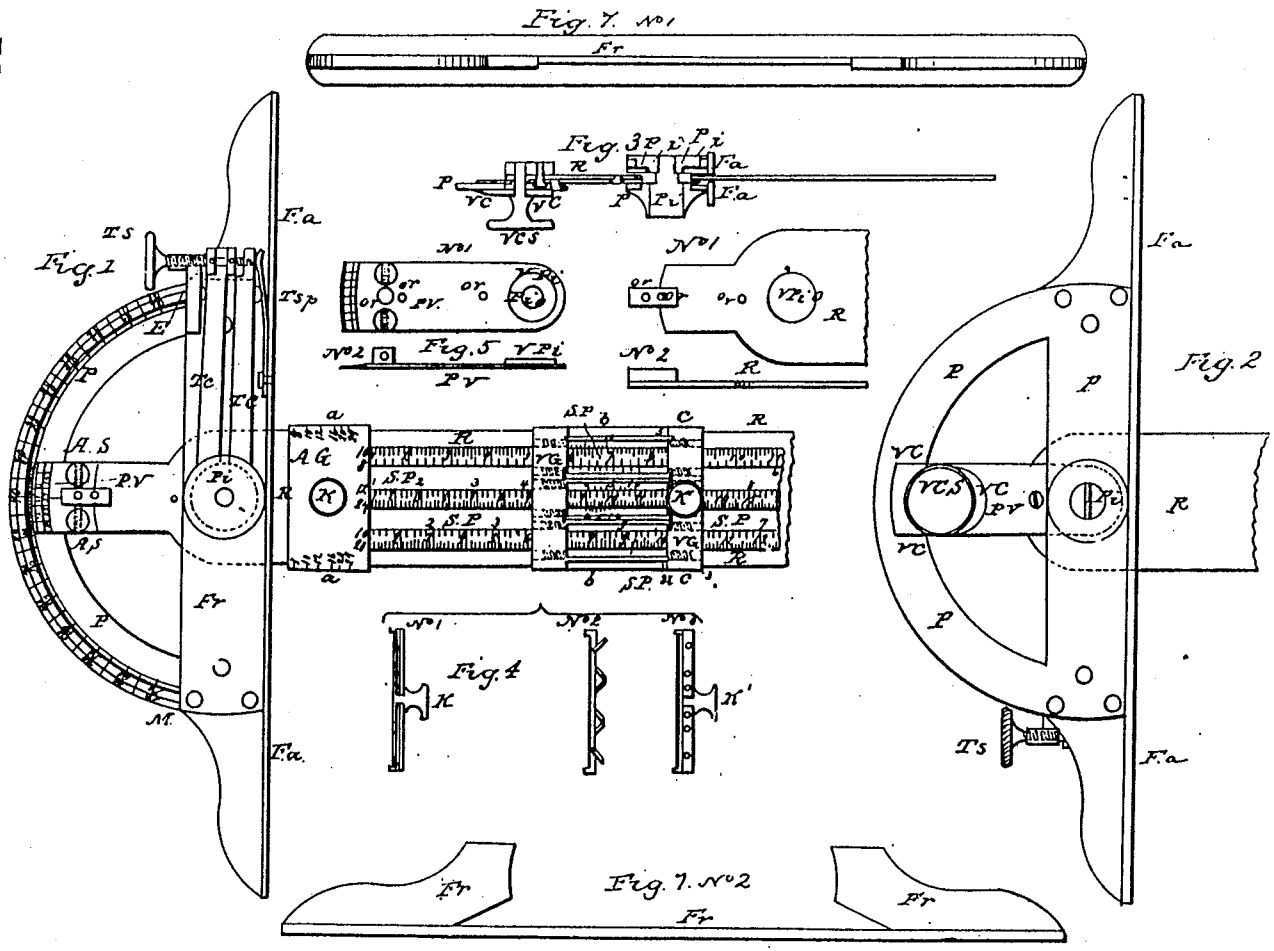
Witnesses
Lewis Tappan
Geo. W. Tucker
Inventor
Josiah Lyman
N. PETERS, Photo-Lithographer, Washington, D. C.